US012785806B2

(12) United States Patent
Ozdur

(10) Patent No.: US 12,785,806 B2
(45) Date of Patent: Nov. 3, 2026

(54) RF SIGNAL TRANSMISSION OVER A LOW NOISE FACTOR FIBER

(71) Applicant: TOBB EKONOMI VE TEKNOLOJI UNIVERSITESI, Ankara (TR)

(72) Inventor: Ibrahim Tuna Ozdur, Ankara (TR)

( * ) Notice: Subject to any disclaimer, the term of this patent is extended or adjusted under 35 U.S.C. 154(b) by 238 days.

(21) Appl. No.: 18/718,610

(22) PCT Filed: Dec. 20, 2022

(86) PCT No.: PCT/TR2022/051536
§ 371 (c)(1),
(2) Date: Jun. 11, 2024

(87) PCT Pub. No.: WO2023/121625
PCT Pub. Date: Jun. 29, 2023

(65) Prior Publication Data

US 2025/0047383 A1 Feb. 6, 2025

(30) Foreign Application Priority Data

Dec. 23, 2021 (TR) ................................ 2021/020817

(51) Int. Cl.

| | |
|---|---|
| ***H04B 10/00*** | (2013.01) |
| ***H04B 10/2575*** | (2013.01) |
| ***H04B 10/61*** | (2013.01) |
| *H04J 14/00* | (2006.01) |

(52) U.S. Cl.
CPC ....... *H04B 10/2575* (2013.01); *H04B 10/614* (2013.01)

(58) Field of Classification Search
CPC .......... H04B 10/2575; H04B 10/25751; H04B 10/25752; H04B 10/25753; H04B 10/25758; H04B 10/25759
See application file for complete search history.

(56) References Cited

U.S. PATENT DOCUMENTS

| | | | | |
|---|---|---|---|---|
| 6,175,672 | B1 | 1/2001 | Newberg et al. | |
| 10,511,437 | B1 | 12/2019 | Ustimchik et al. | |
| 2014/0270807 | A1 | 9/2014 | Hutchinson et al. | |
| 2014/0334824 | A1 | 11/2014 | Goldner et al. | |
| 2021/0152253 | A1* | 5/2021 | Campos | H04B 10/65 |

FOREIGN PATENT DOCUMENTS

| | | | |
|---|---|---|---|
| CN | 109150314 | A | 1/2019 |
| CN | 111505633 | A | 8/2020 |
| WO | 2010048443 | A2 | 4/2010 |

OTHER PUBLICATIONS

ISR for PCT/TR2022/051536; WO 2023/121625 A3 published Jun. 29, 2023.
Written Opinion for PCT/2022/051536 published Jul. 7, 2023.

* cited by examiner

*Primary Examiner* — Daniel G Dobson
(74) *Attorney, Agent, or Firm* — Egbert, McDaniel & Swartz, PLLC

(57) ABSTRACT

An RF signal transmission system which ensures the transmission of very wide bandwidth RF (radio frequency) signals to long distances with low noise factor in the defense industry, RADAR systems, electronic warfare systems, and including a fiber optic transmitter, a fiber optic cable and a fiber optic receiver.

8 Claims, 2 Drawing Sheets

RF SIGNAL TRANSMISSION OVER A LOW NOISE FACTOR FIBER

TECHNICAL FIELD

Figure 1:
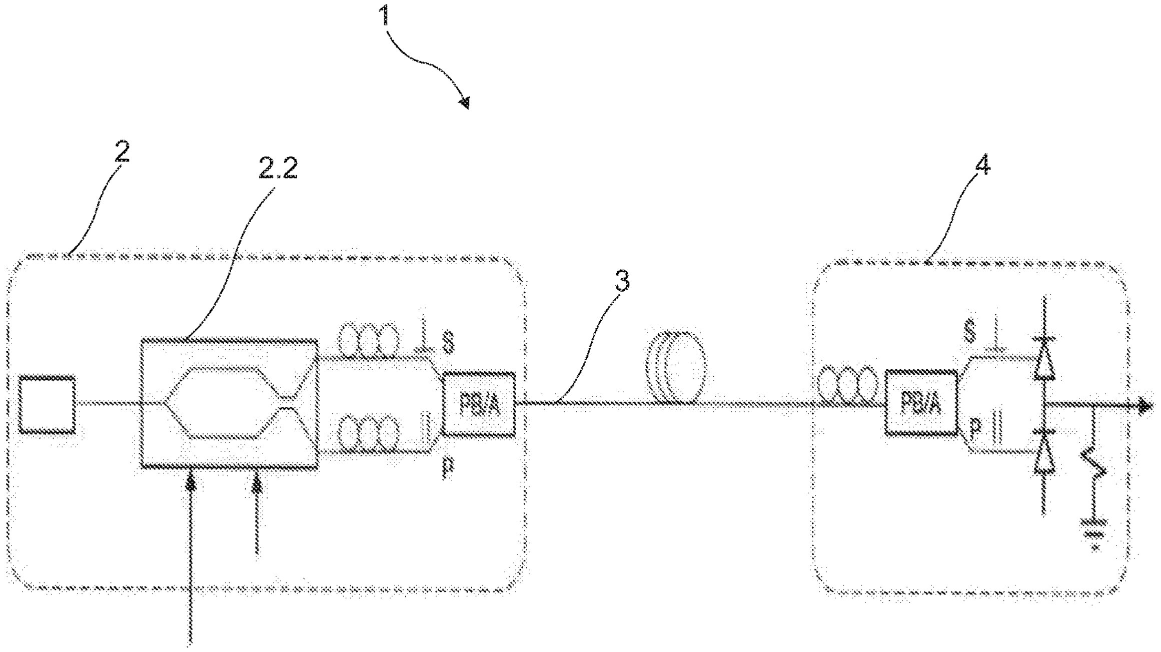

The present invention relates to the transmission of very wide bandwidth RF (radio frequency) signals to long distances with low noise factor in defense industry, RADAR systems, and electronic warfare systems.

PRIOR ART

In the most basic structure of radar stations, a central processing unit (CPU) and antenna structure are generally used. Radar signals produced by the processor (CPU) are transmitted to the antenna and at the same time, the signals received by the antenna are transmitted to the processor. The processor generates radar signals and transmits them to the distant antenna. According to the radar's band, the radar signal pulses at a certain carrier frequency. Radar signals are transmitted with the carrier signal in the said pulse. Carrier signals used in radar systems are very wide bandwidth such as 10 GHz (Gigahertz), 20 GHz (Gigahertz), 2 GHz, 4 GHz. The processor is usually located in a control room near the vehicle, such as a command center where radar tracking is done. The antenna, on the other hand, is placed in an open area according to the signals to be received or transmitted. The communication between the processor and the antenna is made with RF cables. Communication and signal transmission is provided over the RF cable between the antenna location and the processor location. The amount of loss in RF cables is very high, especially at high frequencies. Since the carrier signals used in radar systems are in the high frequency band such as gigahertz (GHz), signal losses in RF cables used in radar systems are very high. In communications in the low frequency band such as cable TV, signal losses are not so much, but in communications in the high frequency band, very high signal losses are experienced at a significant rate. For example, a 100 meter long high-quality cable will lose 12.5 dB for a 1 GHz signal, 50.5 dB for a 12 GHz signal, and 64.6 dB for an 18 GHz signal. The amount of loss in question makes it practically impossible to transmit high-frequency signals over long distances (greater than 100 meters). For example, on a 200 meter long RF cable, the strength of a 12 GHz signal drops to approximately one in 10.000.000.000 (one ten billionth/100 dB), and the strength of a 18 GHz signal is one in 4.000.000.000.000 (one four quadrillionth/126 dB). The loss amounts involved are too high to achieve a high signal-to-noise ratio in any system. Even when a signal at 18 GHz frequency is transmitted 50 meters, only one thousandth of the signal strength can reach the target. As the distance between the processor and the antenna grows, the losses caused by the RF cables used increase proportionally. For this reason, the distance between the processor and the antenna is kept as short as possible, and the processor is positioned as close to the antenna as possible, or even in the same place. Thus, the losses from the cable are minimized.

The processors used in the radar system are high-capacity, high-tech products and their prices are very high. Processors are the most important and most expensive components of radar systems. Antennas are much cheaper devices than processors. The processor and antenna must be located next to each other or very close to each other due to the high losses in the transmission of the RF signal. This situation brings some limitations and disadvantages. One of the most important disadvantages is the weakness of defense, when the radar antenna is hit in situations such as battle or conflict, the antenna and the processor are destroyed together. Since the antenna is not an expensive device, hitting the antenna is acceptable, but the simultaneous damage to the processor both increases the loss and is undesirable. With the present application, this technical problem can be solved. With the present application, it is possible to carry RF signals to long distances with low noise factor and losses. As another disadvantage experienced due to the losses in the RF cable; the antenna should be positioned in places where it can see long distances, and it should not be affected by physical obstacles such as trees and buildings. However, the most suitable place for the antenna may not always be suitable for the Radar processor. To solve this problem, radar antennas are placed in less suitable places or both radar antenna and processor are placed inside a spherical structure.

Currently, there are some known applications that are used to reduce the losses in the transmission of RF signals. One of these applications is the transmission of RF signals, known as RF over fiber, over fiber optic cable. The solution in question uses a laser, a modulator, a photo detector and a fiber optic cable. Continuous (CW) light is emitted from the laser. The continuous light coming out of the laser enters the modulator, is modulated in the modulator and converted into a sin wave (sinusoid wave). This wave is then carried over the fiber cable to the desired location. Since the loss in fiber cables is very low, there is no serious loss in the transmission of the signal over the fiber cable. The power loss amount of fiber optic cables is 0.2 dB/km. The signal carried by fiber cable is converted back to RF signal by photo detector. In this application, the RF signal to be transported is converted into an optical signal, then transmitted as an optical signal with a fiber cable, and finally the optical signal is converted back to an RF signal. This application has some disadvantages. The most important of these are the high noise factor and noise limitations. In the system in question, there is a noise coming from the laser. The most important factors determining the noise factor in RF-on-fiber transmission systems are the relative intensity noise of the laser (RIN), the on-off voltage value of the optical modulator, and the optical architecture. One of the two important factors affecting the noise factor is optical power and the other is laser magnitude (RIN) noise. The most important factor limiting the optical power value is the maximum power value that high speed photo detectors can withstand. New photodetector technologies are needed to increase the said peak power value. Another factor affecting the noise factor is the noise RIN value of the laser, and the RIN value of the semiconductor lasers available in the market is usually-150 dBc/Hz (±10 dB). A few companies specializing in this field offer the lowest RIN value of −168 dBc/Hz. These lasers are highly specialized devices and their costs are quite high.

There is a solution used to eliminate the laser noise experienced in the transmission of RF signals over the fiber optic cable. This solution is a method called balanced detection. In this method, a dual output Mach-Zehnder modulator (MZM) and two fiber optic links are used. In the technique in question, both outputs of the Mach-Zehnder modulator are used. These outputs are completely complementary to each other. Although the Mach-Zehnder modulator normally has two outputs, it is more common to produce a single output as most systems use a single fiber cable. However, there are MZMs with dual outputs for some specialized applications. In one application, the two outputs of the MZM are detected by two separate photo detectors (photo diode). Then, the current difference of the two diodes is taken. Since the RIN noise coming from the laser is the same in both photo diodes, the RIN noise is filtered out at the RF output when the current difference is taken. On the other hand, the RF signal comes out with a 180 degree phase difference at both fiber outputs of the MZM. When we subtract two signals with a 180 degree phase difference between them, the signals are actually added together and the RF signal strength increases. The most important disadvantage of applications using MZM is the use of two fiber cable lines. Using two separate fiber cable lines to transmit the signal is not an easy and acceptable situation in practice. In another technical problem, one fiber can expand or contract more than the other due to reasons such as temperature and stress in fiber cables over time. Due to all these and similar reasons, applications using MZM are not implemented in practice.

In the United States patent document numbered US2014334824, which is in the state of the art, there is a fiber optic receiver system. In this system, the optical signal is transmitted from the modulation unit to the optical receiver and then to the RF transmitter with a fiber cable. The signal coming from the same line is transmitted from the electro-optical converter to the RF receiver, using the same fiber cable, providing a signal output that can have different forms coming to the demodulator with a high-speed photo diode. Elements such as polarization control/splitters included in the application are not used in the said patent document. In the present application, the laser beam is split into two, after being modulated with the RF signal, it is combined and transmitted as an optical signal over a single fiber line, then the laser beam is split into two again at the receiver and converted into an RF signal.

In the United States patent document numbered US2014270807, which is in the state of the art, there is a laser signal line that eliminates photo diode errors. In this study, after the laser signal enters a Mach-Zehnder modulator, it is transmitted to the polarization controller and polarization splitter, respectively, as output. The RF output is obtained by reducing the signal from here to the photo diode. Elements such as polarization control/splitters included in the application are not used in the said patent document. In the present application, the laser beam is split into two, after being modulated with the RF signal, it is combined and transmitted as an optical signal over a single fiber line, then the laser beam is split into two again at the receiver and converted into an RF signal.

Objects of the Invention

The object of the present invention is to realize an RF signal transmission system that enables the optical transmission of RF signals over a single fiber line with low losses and cost-effectiveness.

Another object of this invention is to realize an RF signal transmission system that can be used in high frequency RF signal transmission in areas such as 5G, defense industry, and radar technologies.

Another object of the present invention is to realize an RF signal transmission system that enables RF signals to be transmitted over a single fiber cable, polarized perpendicular to each other.

DETAILED DESCRIPTION OF THE INVENTION

The RF signal transmission system realized to achieve the purpose of the present invention is shown in the attached figures, wherein;

FIG. 1. is a schematic view of the RF signal transmission system.

Figure 2:
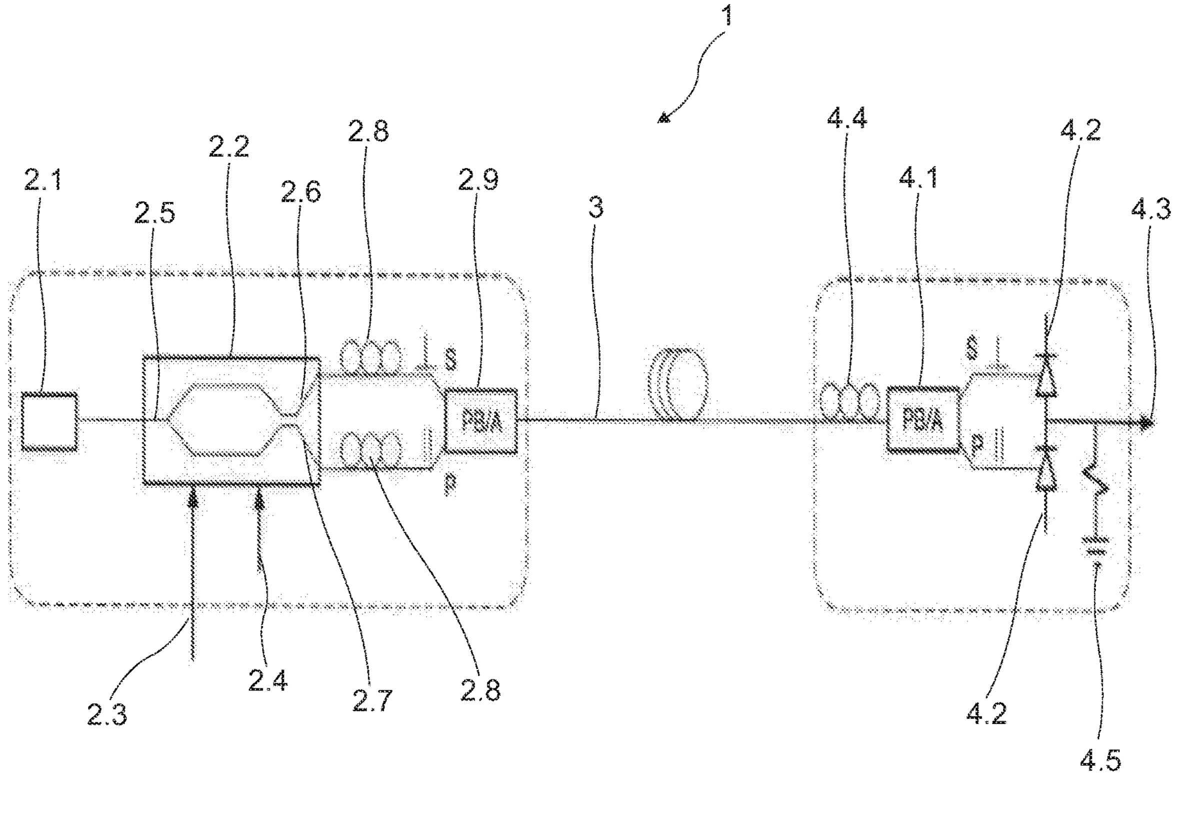

FIG. 2. is a schematic view of the system parts of the RF signal transmission.

Figure 3:
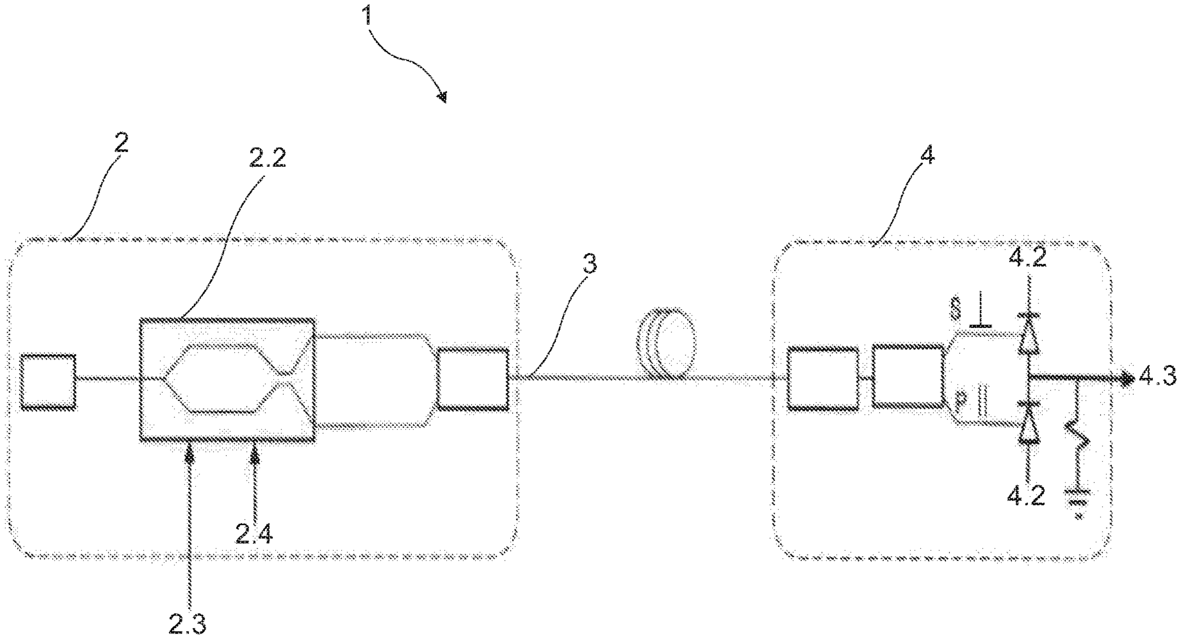

FIG. 3. is a schematic view of one embodiment of the RF signal transmission system.

Figure 4:
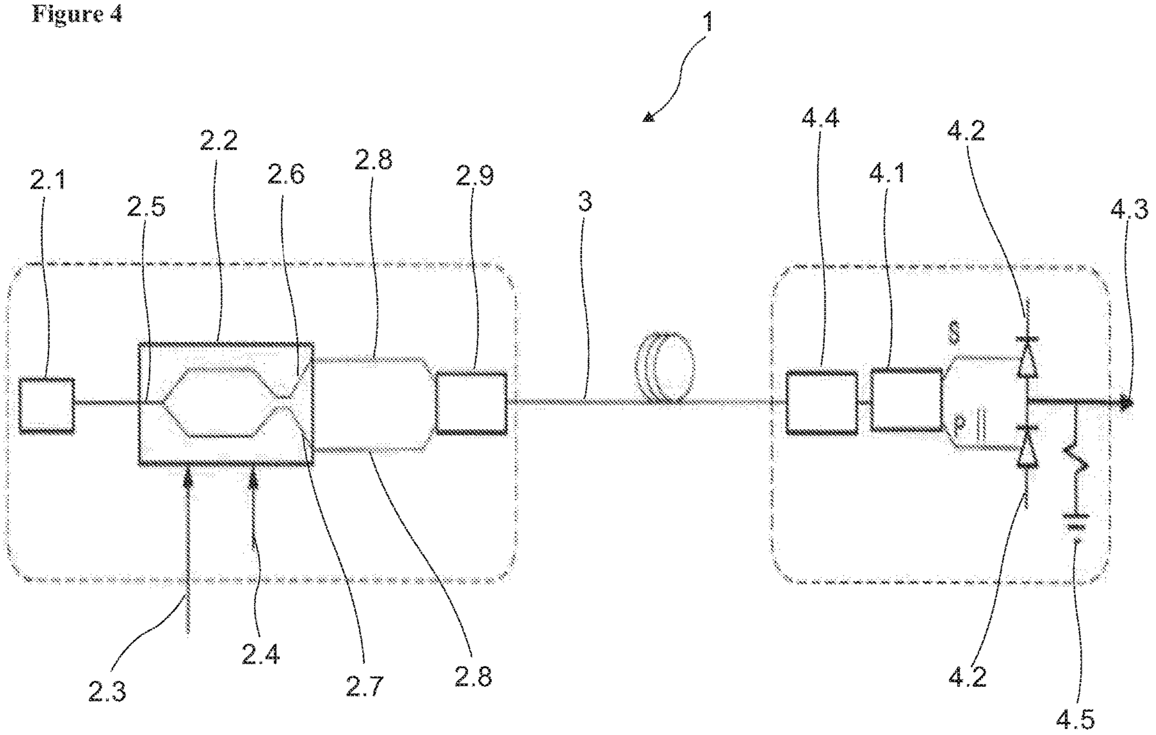

FIG. 4. is a schematic view of the parts in the RF signal transmission system application.

The components given in the figures are enumerated individually, and the meanings of these numbers are given below.

- 1. RF signal transmission system
- 2. Fiber optic transmitter
  - 2.1. Laser
  - 2.2. Modulator
  - 2.3. RF input
  - 2.4. Modulator DC voltage input
  - 2.5. Modulator optical input
  - 2.6. Modulator first optical output
  - 2.7. Modulator second optical output
  - 2.8. Polarization controller
  - 2.9. Polarization combiner
- 3. Fiber optic cable
- 4. Fiber optic receiver
  - 4.1. Polarization splitter
  - 4.2. Photo detector
  - 4.3. RF output
  - 4.4. Receiver polarization controller
  - 4.5. Resistance and grounding The present invention is an RF signal transmission system ensuring the transmission of wide bandwidth (high frequency) RF (radio frequency) signals to long distances optically with low noise factor in defense industry, RADAR systems, electronic warfare systems, and comprising a fiber optic transmitter (2), a fiber optic cable (3) and a fiber optic receiver (4), characterized by; the fiber optic transmitter (2) splitting the laser beam into two and modulating them perpendicular to each other with the RF signal to be transmitted, then combining the optical signals and transmitting them from a single output to a fiber optic receiver (4) with a single fiber optic cable (3) and comprising:

at least one laser (2.1) source, at least one modulator (2.2) comprising at least one modulator optical input (2.5), at least one RF input (2.3), at least one modulator first optical output (2.6), at least one modulator second optical output (2.7), and modulating the signal given from the RF input (2.3) with the optical signal and splitting it into two such that they would be perpendicular to each other, at least one polarization combiner (2.9), located at the output of the modulator (2.2), vertically combining two optical signals coming from the first optical output (2.6) and the second optical output (2.7) of the modulator (2.2), the fiber optic receiver (4) splitting the optical signal with orthogonal polarization coming from the fiber optic transmitter (2) into two, and then separating the perpendicular polarizations from each other and converting them to an RF signal and comprising the following:

at least one polarization splitter (4.1), at least two photodetectors (4.2), which enable converting each optical signal to RF signal, at least one RF output (4.3).

The RF signal transmission system (1), which is the subject of the invention, provides transmission of high-frequency analog RF (radio frequency) signals with low noise factor in many fields such as radar systems, defense industry, electronic warfare systems, and 5G technologies. There are serious losses in the transmission of high-frequency RF signals. With the patent that is the subject of the application, high frequency RF signals can be transmitted optically to the preferred location with very low losses.

The RF signal transmission system (1) includes at least one fiber optic transmitter (2), at least one fiber optic receiver (4), and a fiber optic cable (3) that provides transmission between the fiber optic transmitter (2) and the fiber optic receiver (4). The transmission of signals between the fiber optic transmitter (2) and the fiber optic receiver (4) can be achieved with very low losses over a single fiber optic cable (3).

In radar systems, the fiber optic transmitter (2) is preferably located where the processor (CPU) producing the radar signals is located. In radar systems, the processor is located in a place such as the control center, and the antenna is placed in open areas where signals can be received unhindered. The fiber optic receiver (4), on the other hand, is placed where signals such as antennas are received. Signal transmission is provided by pulling a fiber optic cable (3) between the fiber optic transmitter (2) and the fiber optic receiver (4). Since there are very low losses in the transmission of high-frequency analog RF signals in the RF signal transmission system (1), which is the subject of the application, the fiber optic cable (3) can be used in the preferred length. Thanks to the said advantage, the distance between the fiber optic transmitter (2) and the fiber optic receiver (4) can be adjusted as desired. The radar system processor can be located in a safe place, and a fiber optic transmitter (2) is placed where the processor is. The fiber optic receiver (4), on the other hand, is placed in the preferred location independent of the fiber optic transmitter (2) and the distance, such as an open field, high altitude observation point. High frequency RF signals can be transmitted over long distances with the fiber optic cable (3) drawn between the fiber optic transmitter (2) and the fiber optic receiver (4).

In the RF signal transmission system (1), high frequency RF signals are transmitted optically. The high-frequency RF signals to be transmitted are superimposed on two split laser beams with a perpendicular angle between them. Then, the polarized laser beams on which the RF signals are found are combined. All these processes are performed in the fiber optic transmitter (2). Then, the laser beam (wave) coming out of the fiber optic transmitter (2) is carried to the required distance by the fiber optic cable (3) and transmitted to the fiber optic receiver (4). After receiving the polarized laser beam containing RF signals on the fiber optic receiver (4), it splits the laser beam into two again. Each laser beam with perpendicular polarization, which is split into two, is separated from each other by the photo detector (4.2), and the high-frequency RF signal to be transmitted at the end can be directed to the desired location from the RF output (4.3) of the fiber optic receiver (4).

There is preferably at least one laser (2.1) source in the fiber optic transmitter (2) used in the RF signal transmission system (1), which is the subject of the application. The laser (2.1) provides the optical laser beam used to transmit the RF signal. RF signals are carried in the fiber optic cable (3) with the beam provided by the said laser (2.1).

There is preferably at least one modulator (2.2) in the fiber optic transmitter (2). The modulator (2.2) preferably includes at least one RF input (2.3) and at least one first optical output (2.6) and at least one second optical output (2.7). Mach-Zehnder modulator (MZM) is preferably used as a modulator (2.2). The modulator (2.2) is preferably adapted to split the incident laser beam into two. The radio frequency signal to be transmitted from the RF input (2.3) of the modulator (2.2) is input. The signal to be transmitted from the fiber optic transmitter (2) to the fiber optic receiver (4) with the fiber optic cable (3) enters the modulator (2.2) from the RF input (2.3). The high frequency signal entering the modulator (2.2) from the RF input (2.3) is superimposed on the laser beams entering the modulator (2.2) from the modulator optical input (2.5) and splitting into two at the modulator (2.2). One of the two laser beams, on which the RF signal is superimposed, comes out from the modulator (2.2) by being modulated, one from the first optical output (2.6) of the modulator and the other from the second optical output (2.7) of the modulator.

In an embodiment of the invention, there is a polarization controller (2.8) at each optical output. There is preferably one polarization controller (2.8) at the first optical output (2.6) of the modulator and preferably one polarization controller (2.8) at the second optical output (2.7) of the modulator. The polarization controller (2.8) controls whether the polarizations of the laser beams emanating from the modulator optical outputs (2.6-2.7) are perpendicular to each other as preferred.

In an embodiment of the invention, there is a polarization controller (2.8) inside the modulator (2.2), which provides the polarization of the laser beams and adjusts the beams to the preferred polarization, or the modulator (2.2) is adapted to control the polarization in question. The polarization of the laser beams emanating from the modulator (2.2) is done as desired and they are preferably polarized.

The polarization controller (2.8) determines the polarization direction of the laser beams. In the RF signal transmission system (1), which is the subject of the invention, the laser beams are polarized by the polarization controller (2.8) or the modulator (2.2) in such a way that they are perpendicular to each other, with an angle of ninety degrees between them. In the RF signal transmission system (1), which is the subject of the invention, the polarization direction of the laser beams is polarized by the polarization controller (2.8) or the modulator (2.2). Even if the direction of the beam changes in the fiber optic cable (3), there is no problem since the beams are in perpendicular polarization to each other. The transmission of the high-frequency RF signal over a single fiber optic cable (3) with perpendicular polarization by splitting the laser beam into two optically does not pose a problem since the perpendicularity is not disturbed even if the polarization is disturbed, and no losses are experienced thanks to the optical transmission. In a different application of the invention, the polarization of the rays can be transmitted to the desired location by using a fiber optic cable (3) with polarization protection.

In the preferred application of the invention, there is a polarization combiner (2.9) at the optical outputs of the modulator (2.2) in the fiber optic transmitter (2). The polarization combiner (2.9) is connected to the first optical output of the modulator (2.6) and the second optical output of the modulator (2.7) and combines the optical rays coming from the said optical outputs. Thus, laser beams containing RF signals can be combined and transmitted with a single fiber optic cable (3).

The fiber optic receiver (4) preferably includes polarization splitter (4.1), photo detectors (4.2), RF output (4.3), receiver polarization controller (4.4) and resistor and ground (4.5). The optical beam transmitted to the fiber optic receiver (4) with the fiber optic cable (3) enters the polarization splitter (4.1). The laser beam is split into two by the polarization splitter (4.1). Two laser beams with perpendicular polarization emerge from the polarization splitter (4.1). There is a photo detector (4.2) at each output of the polarization splitter (4.1). Thanks to the photo detectors (4.2), the optical signal is converted back to the RF signal. The optically transmitted RF signal is obtained by subtracting the signals coming out of the photo detectors (4.2). After the optical signal is converted to an RF signal, the high frequency RF signal can be transferred from the RF output (4.3) to the preferred location. The RF output (4.3) can be transferred to the place where the RF signal transmission system (1) is used, such as the antenna of the radar system.

In an embodiment of the invention, the receiver polarization controller (4.4) is used in the fiber optic receiver (4). Since the polarization can rotate during the transmission of the optical signal with the fiber optic cable (3), if the fiber optic cable (3) is not polarization protected, the receiver polarization controller (4.4) can be used to control the polarization.

The basic structure and usage of the RF signal transmission system (1), which is the subject of the application, is as follows. The RF signal transmission system (1) consists of a fiber optic transmitter (2), a fiber optic cable (3) and a fiber optic receiver (4). According to the technological field where the RF signal transmission system (1) will be used, the fiber optic transmitter (2) and the fiber optic receiver (4) are positioned where they will be used. When the RF signal transmission system (1) is used for a radar system, the fiber optic transmitter (2) is placed where the processor (CPU) is, and the fiber optic receiver (4) is located near the antenna. The transmission between the fiber optic transmitter (2) and the fiber optic receiver (4) is provided by a fiber optic cable (3). The fiber optic transmitter (2) consists of; a laser (2.1), a modulator (2.2), an RF input (2.3), a modulator DC voltage input (2.4), a modulator optical input (2.5), a modulator first optical output (2.6), a modulator second optical output (2.7), and a polarization combiner (2.9). The fiber optic receiver (4) consists of a polarization splitter (4.1), photo detectors (4.2), an RF output (4.3) and a resistor and ground (4.5).

The signals generated by the processor are transmitted as RF signals from the RF input (2.3) to the modulator (2.2) of the fiber optic transmitter (2). The beam provided by the laser (2.1) inside the fiber optic transmitter (2) enters the modulator (2.2) from the modulator optical input (2.5) part. The laser beam is split into two in the modulator (2.2) and the RF signal to be transmitted is superimposed on the beam. After the laser beam is split into two by the modulator (2.2) and modulated with the RF message, it comes out from the first optical output (2.6) and the second optical output (2.7) of the modulator (2.2). The laser beam coming out of the modulator's first optical output (2.6) and the modulator's second optical output (2.7) is polarized by the modulator (2.2) or polarization controller (2.8), one with "S" and the other with "P" poles, perpendicular to each other. Optical polarized optical rays perpendicular to each other are transmitted to the fiber optic receiver (4) over the fiber optic cable (3) after they are combined by the polarization combiner (2.9). The optical signals coming to the fiber optic receiver (4) are split into two polarized signals perpendicular to each other by the polarization splitter (4.1). Then, the said optical signals with perpendicular polarization are converted into RF signals by the photo detector (4.2) and their differences are taken, and output as a high frequency RF signal from the RF output (4.3). The RF output (4.3) is connected or transmitted to the place where it is intended to be used as an antenna. Thus, thanks to the RF signal transmission system (1), the high-frequency RF signal is transmitted optically to the preferred location over a single fiber cable (3).

The invention claimed is:

1. A radio frequency (RF) signal transmission system that ensures optical transmission of wide band radio frequency signals over long distances with low noise factor, the RF signal transmission system comprising:

a fiber optic transmitter;

a fiber optic receiver;

a single fiber optic cable, wherein said fiber optic transmitter combines an optical signal;

at least one laser source;

at least one modular having at least one modulator optical input and at least one RF input and at least one modulator first optical output and at least one modulator second output, said at least one modular modulating a signal from the at least one RF input with the optical signal and splitting the signal into two beams so as to be perpendicular to each other;

at least one polarization combiner positioned at an output of said at least one modular so as to combine the two beams from the at least one modulator first optical output and the at least one modulator second optical output of said at least one modular, wherein said fiber optic receiver splits the optical signal with orthogonal polarization from said fiber optic transmitter into two optical signals and then separates the two optical signals and converts the two optical signals into an RF signal, said fiber optic receiver comprising:

at least one polarization splitter;

at least two photodetector which converts each of the two optical signals into the RF signal;

at least one RF output; and a pair of polarization controllers positioned within said at least one modular so as to polarize laser beams and to adjust the laser beams to a desired polarization, one of the pair of polarization controllers positioned at the at least one modulator first optical output and another of the pair of polarization controllers positioned at the at least one modulator second optical output, said pair of polarization controllers adapted to control whether polarizations of the laser beams from the at least one modulator first optical output and the at least one modulator second optical output are perpendicular to each other.

2. The RF signal transmission system of claim 1, wherein said fiber optic transmitter superimposes high frequency RF signals on the pair of laser beams with a perpendicular angle between the pair of laser beams and combines the pair of polarized laser beams containing the RF signals thereon and outputs the pair of polarized laser beams from said fiber optic transmitter as a single line.

3. The RF signal transmission system of claim 1, wherein said fiber optic receiver splits the polarized laser beams containing RF signals into two laser beams and separates each of the two laser beams with perpendicular polarization by said at least two photodetectors so as to obtain a high frequency RF signal transmitted by said fiber optic transmitter and directs from said at least one RF output.

4. The RF signal transmission system of claim 1, wherein said at least one modular in said fiber optic transmitter being a Mach-Zehnder modulator.

5. The RF signal transmission system of claim 1, wherein said at least one modular is adapted to control the polarization of each laser beam and to polarize each laser beam perpendicular to each other.

6. The RF signal transmission system of claim 1, wherein said fiber optic receiver transmits the optical beam with said fiber optic cable entering said at least one polarization splitter, said at least one polarization splitter being adapted to split the laser beam into two laser beams and outputting the two laser beams perpendicular to each other.

7. The RF signal transmission system of claim 1, wherein said at least two photodetectors converts the optical signal into the RF signal.

8. The RF signal transmission system of claim 1, wherein said polarization controller in said fiber optic receiver being adapted to control a rotating polarization during transmission of the optical signal.

* * * * *